(12) United States Patent
Gray et al.

(10) Patent No.: US 6,357,129 B1
(45) Date of Patent: Mar. 19, 2002

(54) OPTICAL NON-CONTACTING CYLINDRICITY GAUGE

(75) Inventors: George M. Gray, Kitchener; Daniel S. Cormier, Brantford, both of (CA)

(73) Assignee: Babcock & Wilcox Canada, Ltd., Cambridge (CA)

( * ) Notice: Subject to any disclaimer, the term of this patent is extended or adjusted under 35 U.S.C. 154(b) by 0 days.

(21) Appl. No.: 09/531,792

(22) Filed: Mar. 21, 2000

(51) Int. Cl.[7] .................................................. G01N 21/00
(52) U.S. Cl. ............................. 33/550; 33/293; 33/543; 33/555.1; 33/16.21; 356/601; 356/241.1
(58) Field of Search .................... 33/263, 276, 278, 33/280, 286, 227, 293, 523, 542, 543, 544, 544.1, 544.5, 544.6, 546, 547, 549, 550, 551, 552, 555.1, 555.2, DIG. 21; 356/601, 154, 237.1, 241.1

(56) References Cited

U.S. PATENT DOCUMENTS

| | | | | |
|---|---|---|---|---|
| 3,216,120 A | * | 11/1965 | Sweigart et al. ............... | 33/552 |
| 3,406,292 A | * | 10/1968 | Geier et al. ................... | 356/601 |
| 4,471,530 A | * | 9/1984 | Kirven .......................... | 33/293 |
| 4,653,196 A | * | 3/1987 | Moschner et al. ............ | 33/552 |
| 5,166,891 A | * | 11/1992 | Reiter et al. ................. | 33/555.1 |
| 6,026,582 A | * | 2/2000 | Donohue et al. ........... | 33/544.1 |

* cited by examiner

Primary Examiner—Andrew H. Hirshfeld
(74) Attorney, Agent, or Firm—Robert J. Edwards; Eric Marich

(57) ABSTRACT

A device measures cylindricity of a cylinder having an axial end, a circumference and an inside diameter. The device includes a track for placement at an axial end of the cylinder to be measured. The track extends around the circumference of the cylinder. A pair of trucks are mounded to the track for movement around the cylinder circumference. A sighting beam generator, in particular, a laser, is connected to each truck for aiming sighting beams axially along the inside diameter of the cylinder. A micrometer adjustment is connected between each laser and its truck for adjusting a radial position of each sighting beam.

12 Claims, 2 Drawing Sheets

OPTICAL NON-CONTACTING CYLINDRICITY GAUGE

FIELD AND BACKGROUND OF THE INVENTION

1. Field of the Invention

The present invention relates in general to fabrication techniques, and in particular to a new and useful method and apparatus for gauging the roundness of a heat exchanger shell or can.

2. Description of the Related Art

When heat exchangers are built, it is extremely important to ensure the roundness of the shell can assemblies to accept their pre-built internals. The first tool design to ensure this roundness or "cylindricity" consisted of a large cylinder turned to the low dimension of the diameter tolerance. This plug gauge was inserted into the upended assembly by means of a crane and measurements taken to locate any distortion in the can. Subsequently the plug would be removed, the assembly laid back down horizontally and the interfering areas of the can would be jacked. The eventual design of the gauge incorporated a series of five disks set 20" apart on an 8" pipe. The outer diameter of the disks acted as the gauging surface and with large holes cut in the disks, the fitters could climb into the shell and precisely mark the tight areas. This process still required numerous upendings before a smooth insertion and extraction of the plug was realized. Though very time consuming, the operation guaranteed a can which would accept the tube bundle assembly.

There is no currently available simple and effective mechanism or technique for ensuring roundness or cylindricity of a heat exchanger shell or can.

SUMMARY OF THE INVENTION

The goal or object of the invention is to devise a tool and method that would identify the cylindricity in the can while never having to upend the can. The invention uses an optical gauge having a track and trolley designed for carrying lasers. The invention is very adaptable to all sizes of cylinder by simply modifying its mounting arrangement and building a new calibration ring for the new size or shape.

Accordingly, an object of the present invention is to provide a device and a method for measuring cylindricity of a cylinder having an axial end, a circumference and an inside diameter, comprising a track for placement at an axial end of a cylinder to be measured, the track extending around a circumference of the cylinder to be measured, at least one truck mounted to the track for movement around the cylinder circumference, a sighting beam generator such as a laser or other straight beam generating mechanism connected to the truck for aiming a sighting beam axially along the inside diameter of the cylinder to be measured and adjusting means connected between the sighting beam generator and the truck for adjusting a radial position of the sighting beam generator and its beam on the truck.

A further object of the invention is to include a calibration or setting disk with the device which includes a calibration line that can be used to zero the initial position for the sighting beam. Although the preferred form of the sighting beam is a laser beam which generates optical light, other visible beams such as electron beams may be used. Further, non-optical beams such as an infrared laser beam may be used with further instrumentation. However, it is important that the beam be sufficiently narrow and accurate to achieve the tolerance required by the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
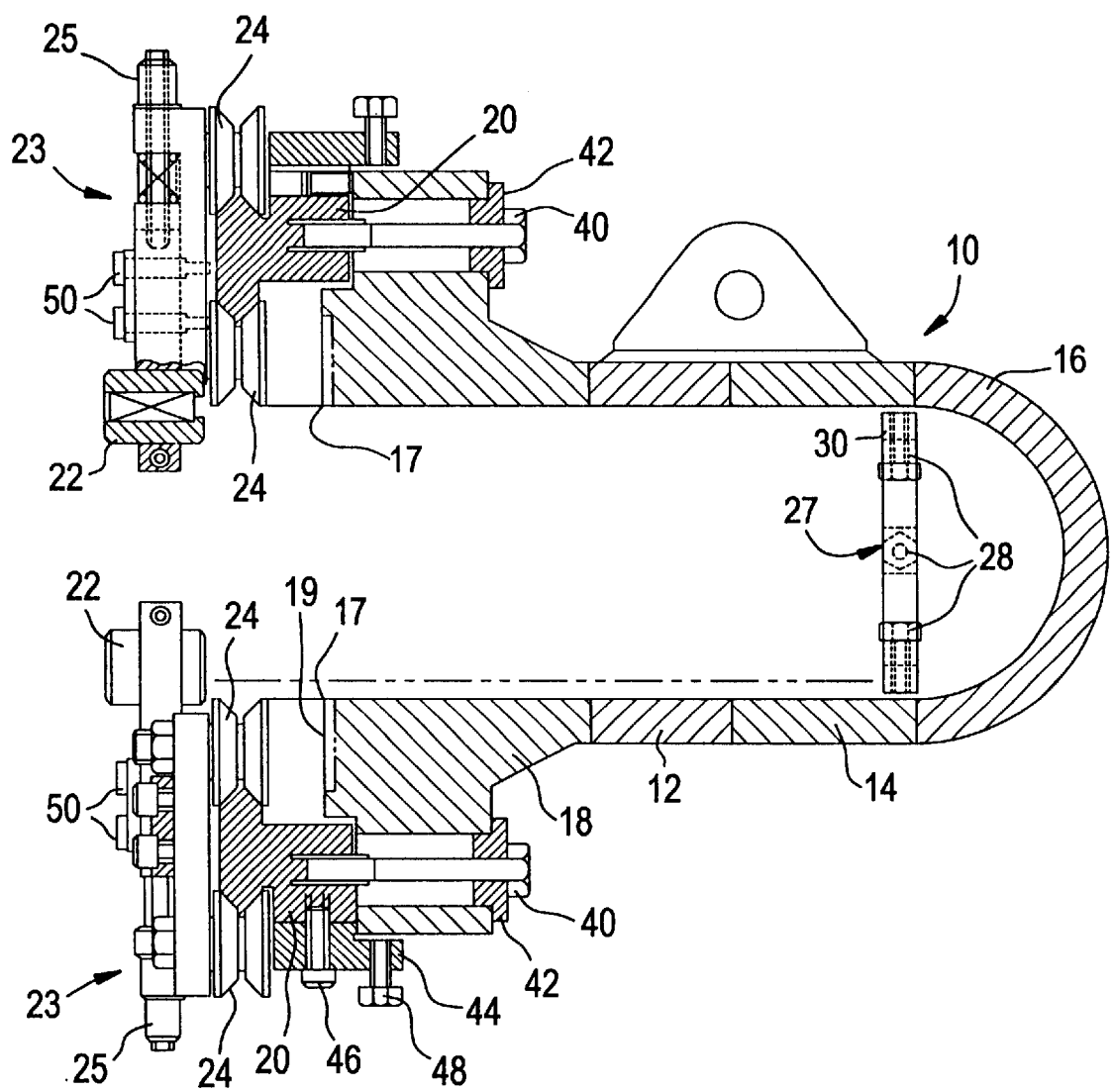
FIG. 1 is a side sectional view of the device of the present invention used to measure the inside diameter of a cylinder, in particular the can assembly or shell of a heat exchanger or other similar structure.
Figure 2:
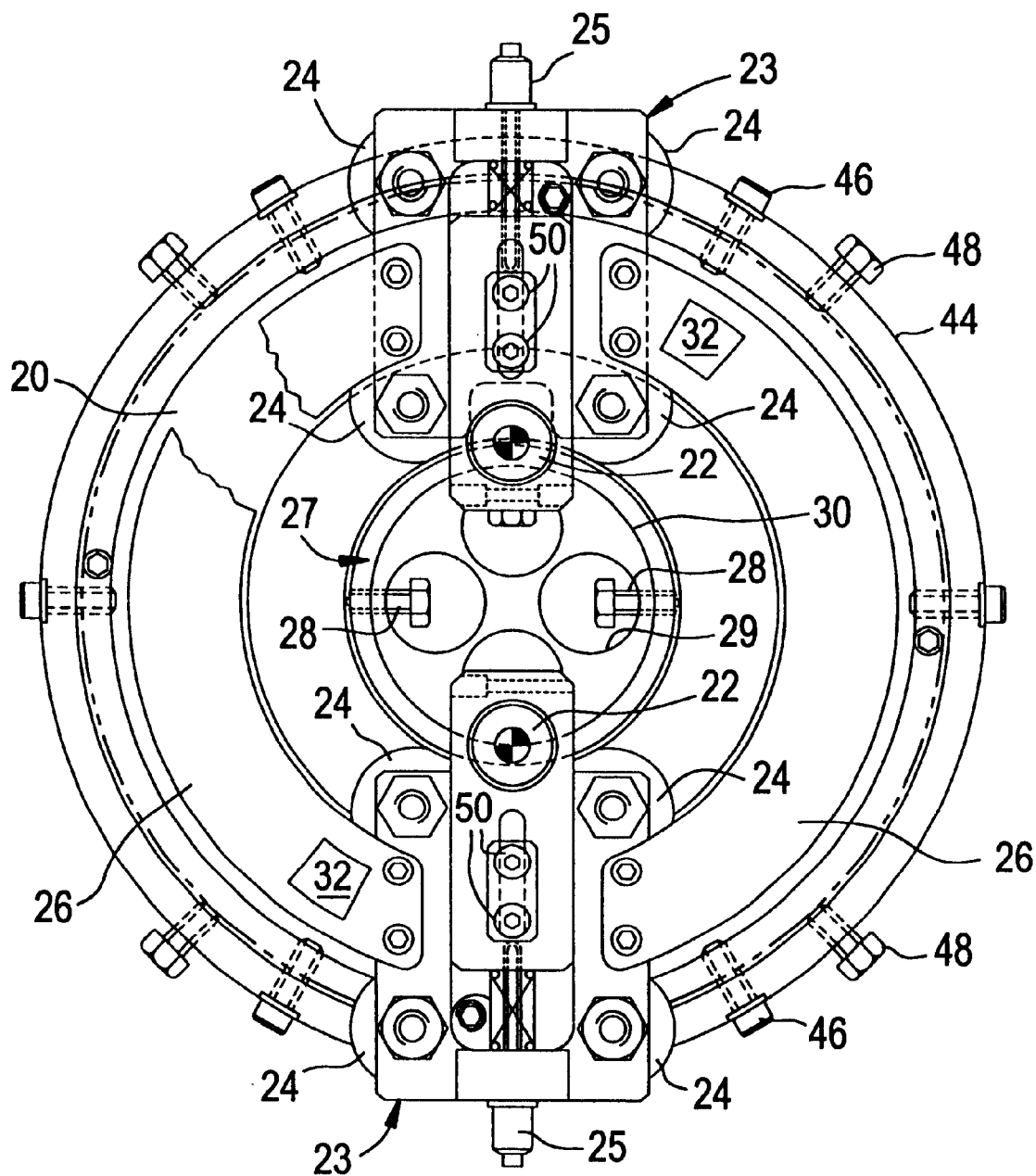
FIG. 2 is an axial end view thereof.

The following will describe the application of the optical gauge of the invention to check the inside diameter of typical moderator can assemblies. Referring to the figures:

A can assembly 10 to be measured is made up of two cylindrical cans 12 and 14 of just over 5 feet in diameter, one domed head 16 which blocks off one end of the assembly and a machined flange 18 which is attached to the other end of the assembly. The flange has a face or surface 19 and is used to bolt off the internals (not shown), therefore the assemblies' cylindricity must be square to this face. To this flange 18 a track 20 of double-vee construction is fastened parallel to the flange surface 19. This tract 20 is machined to exacting tolerances. Two laser carrying trucks 23 have an assembly of bearings pressed into vee grooved wheels 24 and micrometers 25. The two trucks are connected together for balance and two point accuracy with supports 26. The arrangement is set-up by pointing two lasers 22 at the inside edge 17 of the flange 18 and rotating them 360° to establish proper concentricity with the flange.

With the optical gauge set to the flange, a setting disk 27 is installed into the far end of the assembly 10. This disk has adjustable feet 28 on its external diameter for ease in setting the ring to the center of the cylinder. A circular line 30 is machined on the setting ring 27 at a known diameter. This diameter is used to zero out the micrometers 25 on the trucks. At this point, the fitters are able to radially adjust the lasers 22 to the diameter at the small end of tolerance. By rotating the trucks 23 on the track 20, any interfering surface is easily spotted and the cylinder is adjusted accordingly. This adjustment is done with complete access to the inside of the vessel 10. The rotation of the lasers also allows the fitters to identify many more potentially interfering locations. The power source 32 for the lasers is 6 vdc and is transported on board the trucks.

Advantages of the invention include the following. Compared to the prior method which included numerous up-endings and multiple climbs in and out of the assembly, open access to the cylinder using the new method is the greatest time savings. The new process makes it easier to find problem areas; therefore, the fitter has a better chance of ensuring a perfect cylinder. The invention can also be adapted to many diameters and geometries. Another feature of this method is that all observations are done at ground level, thereby ensuring a much safer process overall.

Alternative arrangements can be devised for the invention to be used in situ for dimensional information gathering. By creating different calibrated ring arrangements and laser tracks the process can be used to gauge virtually any shape. Alternate methods of setting the lasers can be substituted for the setting disk 27.

Setting disk 27 has four holes 29 therethrough which each receive the heads of the adjustable feet 28, that are each in the form of bolts threaded into the thickness of the disk 27. Circular line 30 can be in the form of a V-shaped groove machine into the surface of disk 27 which faces the lasers 22,22.

Track 20 is fixed to flange 18 by a set of bolts 40 and washers 42 which are spaced circumferentially around the flange. To properly center track 20, a ring 44 is fixed with circumferentially spaced and axially extending bolts 46 to track 20. A set of circumferentially spaced set screws 48 are threaded into ring 44 and are used to engage the outer circumference of flange 18 to carefully center track 20 on flange 18 before bolts 40 are tightened to fix the track to the cylindrical assembly to be measured.

Once micrometers 25 are used to properly align the lasers 22,22, their position is fixed on the trucks 23 by further set screws 50. Line 30 can be used to help center the track 20 on the cylinder. This is done by rotating the trucks on the track and insuring that the beams always fall in the groove forming line 30. Once this is achieved, then micrometers 25,25 are used to move the lasers 22,22 radially outwardly to the proper position for the minimum inside diameter for cylinder assembly 10, and then set screws 50 are tightened to fix the position of the lasers.

While a specific embodiment of the invention has been shown and described in detail to illustrate the application of the principles of the invention, it will be understood that the invention may be embodied otherwise without departing from such principles.

We claim:

1. A device for measuring cylindricity of a cylinder having an axial end, a circumference and an inside diameter, the device comprising:
    a track for placement at an axial end of the cylinder to be measured, said track having means for attaching the track to the cylinder such that the track extends around a circumference of the cylinder to be measured;
    at least one truck mounted to the track for movement around the cylinder circumference;
    a sighting beam generator connected to the truck for aiming a sighting beam axially along the inside diameter of the cylinder to be measured; and
    adjusting means connected between the sighting beam generator and the truck for adjusting a radial position of the sighting beam generator and the sighting beam on the truck.

2. The device according to claim 1 including a second truck mounted to said track for rotation, said truck being positioned on opposite sides of the track, each truck carrying its own sighting beam generator.

3. The device according to claim 1 wherein said sighting beam generator comprises a laser.

4. The device according to claim 1 wherein said track comprises inner and outer track portions, said truck including at least one inner wheel and at least one outer wheel for engaging said respective inner and outer track portions.

5. The device according to claim 1 wherein said adjusting means comprises a micrometer connected between said sighting beam generator and the truck.

6. The device according to claim 1 including calibration means for placement in the inside diameter of the cylinder to be measured, said calibration means including a sighting line for positioning the sighting beam.

7. The device according to claim 6 wherein said calibration means comprises a setting disk having a surface for facing the track, the line comprising a circular line in the surface of the disk.

8. The device according to claim 7 including a plurality of adjusting feet mounted for radial adjustment to the disk for engagement with the inside diameter of the cylinder to be measured for centering the disk in the cylinder to be measured.

9. A method for measuring cylindricity of a cylinder having an axial end, a circumference and an inside diameter, the method comprising;
    mounting a sighting beam generator for rotation around the circumference of the cylinder to be measured, near an axial end of the cylinder to be measured;
    adjusting an axial position of the sighting beam generator for aiming a beam to be generated by the sighting beam generator axially along the inside diameter of the cylinder to be measured;
    using the generator to generate a sighting beam and aiming the sighting beam axially along the inside diameter of the cylinder to be measured; and
    rotating the sighting beam generator around the circumference of the cylinder to be measured for determining the cylindricity of the inside diameter of the cylinder to be measured.

10. The method according to claim 9 including generating a laser beam as the sighting beam.

11. The method according to claim 9 including providing a second sighting beam generator, wherein said sighting beam generators are diametrically opposed to each other and are fixed to each other for rotation together.

12. The method according to claim 9 including positioning a sighting disk in the cylinder to be measured, the sighting disk having a sighting line thereon, and aiming the sighting beam at the sighting line for calibrating an initial position of the sighting beam generator.

* * * * *